O. E. MICHAUD.
ROLLER BEARING.
APPLICATION FILED JUNE 13, 1908.
939,055.
Patented Nov. 2, 1909.
2 SHEETS—SHEET 2.
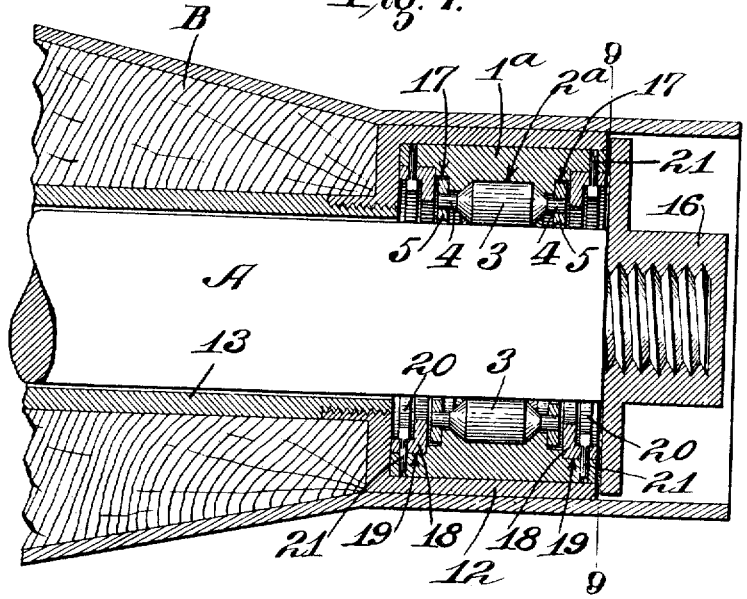
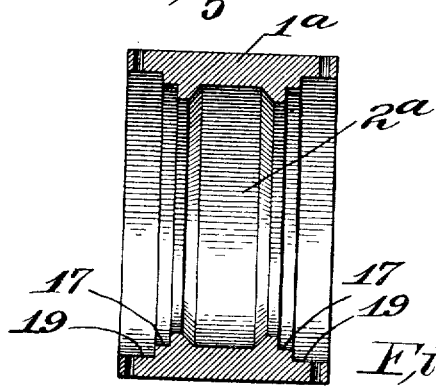
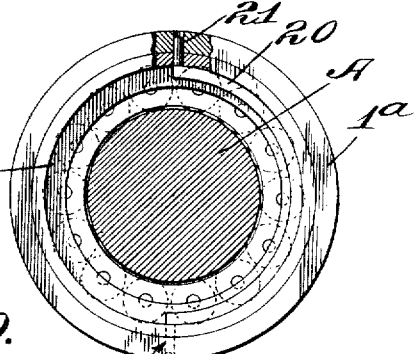
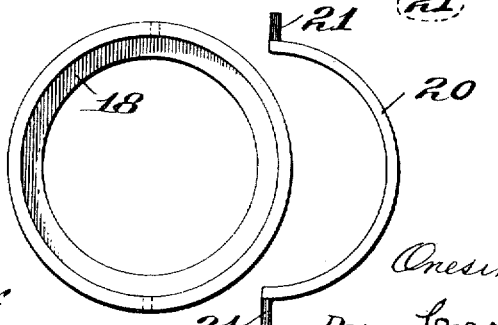
Witnesses:
Edgar T. Farmer
G. A. Pennington
Inventor:
Onesime E. Michaud
By Carr & Carr,
attys.

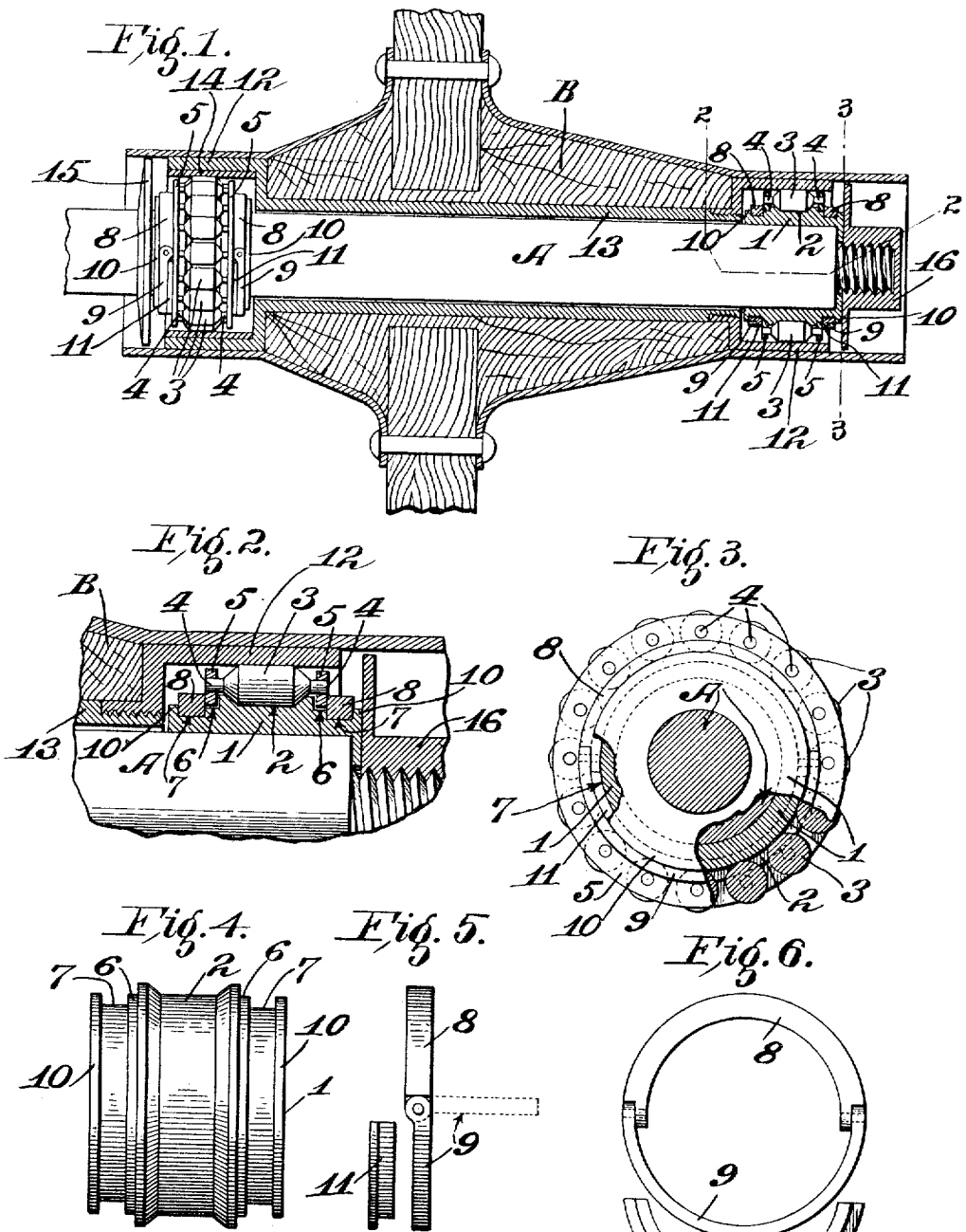

UNITED STATES PATENT OFFICE.

ONESIME E. MICHAUD, OF ST. LOUIS, MISSOURI.

ROLLER-BEARING.

939,055.  Specification of Letters Patent.   Patented Nov. 2, 1909.

Application filed June 13, 1908. Serial No. 438,270.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to roller bearings and has for its principal objects to secure a true rolling contact of the rollers, to provide for the spacing of the rollers, to provide for the ready removal and renewal of the parts, and to attain certain advantages hereinafter more fully appearing.

This invention consists in the parts and in the arrangements and combinations of parts hereinafter described and claimed.

In the accompanying drawings which form part of this specification and wherein like symbols refer to like parts wherever they occur, Figure 1 is a longitudinal section through a wheel hub showing roller bearings embodying my invention applied thereto; Fig. 2 is an enlarged fragmentary sectional view on the line 2—2 of Fig. 1; Fig. 3 is an enlarged sectional view on the line 3—3 of Fig. 1, portions being broken away; Fig. 4 is a side elevation of a bearing ring; Fig. 5 is an edge view of one of the locking devices; Fig. 6 is a front elevation of said locking device; Fig. 7 is a longitudinal section of a portion of a wheel hub embodying a modification of my invention; Fig. 8 is a longitudinal section of the bearing ring shown in Fig. 7; Fig. 9 is a cross-section on the line 9—9 of Fig. 7; and Fig. 10 is a detail view of one of the locking devices shown in Fig. 7.

The rollers in some roller bearings are arranged in a circular series and they are spaced apart by special cages or rings provided for the purpose. Usually, these cages comprise a pair of rings rigidly connected with cross members, or the several rollers have pintles at their ends which are journaled loosely in perforations in said rings, in which case the ends of said pintles are upset or headed on the outside of the rings. In such constructions, it is troublesome to remove parts to make repairs, and especially should only a single roller become broken. By my invention the parts may be quickly removed and the damaged part or parts renewed without the use of special tools or returning the bearing to the factory as is necessary with most bearings now in use.

The main elements of my bearing are a grooved bearing ring, a series of rollers having end pintles journaled loosely in spacing rings, and separable or detachable locking devices adapted to secure said spacing rings in proper relation to said rollers.

Referring to the first sheet of drawings, the bearing therein illustrated comprises a bearing ring 1 which is sleeved on the axle member A. This ring is provided with an annular groove 2 in which the rollers 3 are adapted to run. Preferably, the sides of the groove are inclined or outwardly flared to correspond to the beveled end portions of the rollers. The rollers 3 are provided at their ends with pintles or trunnions 4 which are loosely journaled in perforations in spacing rings 5. These spacing rings fit loosely around shouldered portions 6 on the bearing ring 1 at each side of the grooved portion 2. Adjoining the shouldered portions 6 are peripheral grooves 7. In these grooves are placed the locking devices. In this modification the locking device comprises a sectional ring and filler piece. The ring comprises a semicircular portion 8 of a width and diameter to fit the grooved portion 7 of the bearing ring. Hinged to the first-mentioned semicircular portion 8 is a semicircular securing portion or bail 9. The interior diameter of the bail 9 is greater than that of the portion 8 or sufficient to clear the peripheral flanged portion 10 formed at the edge of the bearing ring by the groove 7. The space between the bottom of the groove 7 and bail 9 of the locking member is filled in with a flanged segmental filler piece or member 11, which is the counterpart of the main portion 8 of the ring.

In assembling the parts of the bearing, the rollers are placed in the groove 2. They may be temporarily held in place by a circular spring clip or any suitable device. The spacing rings 5 are then placed in position, after which the hinged locking rings are placed in position. In applying the locking device the bail or portion 9 is turned at right angles to the portion 8 which may then be placed in the groove 7. Then the segmental filler piece 11 is placed in the groove opposite from portion 8 and the hinged locking portion is moved over said filler piece.

In the drawing, my invention is applied to the hub B of a vehicle wheel. In this case, the hub is provided with two bearing cups 12 which are connected by a tubular sleeve 13 extending through the hub. In each of the cup portions is fitted one of my bearings. The inner bearing cup 12 is provided with a hardened bushing or bearing ring 14 upon which the rollers bear, while the outer cup itself constitutes the bearing ring. The axle A is provided with a collar or shoulder 15 and a flanged nut 16 which serve to hold the bearings in place.

In the second sheet of drawings, I have illustrated a modification of the roller bearing. In this case the rollers are adapted to bear directly against the axle and the bearing ring 1ª is adapted to be fitted in the cup 12 at the end of the hub. This ring 1ª is provided with an internal groove 2ª in which the rollers 3 fit. The spacing rings 5 are similar to those hereinbefore described and fit loosely within the shouldered portions 17 in the bearing ring 1ª. The locking device in this case comprises a flanged ring 18 which is adapted to fit the portion 19 of said bearing ring. A resilient securing member 20 is provided having diametrically extending projections 21 adapted to fit in registering openings in the locking ring and bearing ring.

Obviously, my bearing is applicable to any ordinary shaft as well as to vehicles and may be modified without departing from my invention. Therefore, I do not wish to be limited to the constructions and arrangements shown.

What I claim is:

1. A roller bearing comprising a bearing ring having an annular groove therein, annular shouldered portions at each side of said groove, and annular recessed portions next to said shouldered portions at the outer sides thereof, a series of rollers arranged to travel in the annular groove in said bearing ring, said rollers having axial end spindles, separable rigid spacing rings for said rollers, said spacing rings being adapted to loosely fit said annular shouldered portions and having a series of perforations arranged to receive the end spindles of said rollers, and annular retaining devices for said spacing rings detachably secured in said annular recessed portions of said bearing ring.

2. A roller bearing comprising a bearing ring, rollers arranged to coöperate therewith, separable spacing rings for said rollers, and locking devices arranged to hold said spacing rings in place, said locking devices comprising two semicircular members and a bail hinged to one of said members and adapted to engage the other member.

3. A roller bearing comprising an annular grooved bearing ring, rollers arranged to travel in said groove, separable spacing rings for said rollers, and separable locking devices adapted to hold said spacing rings in place, said locking devices comprising two counterpart semicircular members and a bail hinged to one of said members and adapted to secure the other member thereto.

4. A roller bearing comprising a bearing ring having an annular bearing groove, rollers arranged to travel in said groove, separable spacing rings for said rollers, devices for locking said spacing rings in place, said bearing ring having annular grooves adjacent to the respective spacing rings, and each of said locking devices comprising two counterpart semicircular members adapted to fit in one of said grooves and one of said members having a bail arranged to secure the other member thereto.

5. A roller bearing comprising an annularly grooved bearing ring, rollers arranged to travel in said groove, separable spacing rings for said rollers, and separable securing rings for said spacing rings, each comprising a semi-circular portion adapted to fit an annular groove in said bearing ring adjacent to its respective spacing ring, a semicircular portion of larger interior diameter hingedly connected to said first-mentioned portion, and a separable segmental filler piece adapted to fit said groove in said bearing ring beneath said last mentioned semicircular portion.

In testimony whereof I have signed my name to this specification in the presence of two subscribing witnesses this 11th day of June, 1908, at St. Louis, Missouri.

ONESIME E. MICHAUD.

Witnesses:
G. A. PENNINGTON,
J. B. MEGOWN.